United States Patent [19]

El-Chahawi et al.

[11] 4,036,819
[45] July 19, 1977

[54] UNSATURATED POLYESTER RESINS

[75] Inventors: Moustafa El-Chahawi, Troisdorf; Norbert Vollkommer, Pfarrer, both of Germany

[73] Assignee: Dynamit Nobel Aktiengesellschaft, Troisdorf, Germany

[21] Appl. No.: 578,049

[22] Filed: May 15, 1975

[30] Foreign Application Priority Data

May 21, 1974 Germany .............................. 2424673

[51] Int. Cl.² ...................... C08G 63/54; C08G 63/68
[52] U.S. Cl. ............................... 260/75 H; 260/75 UA
[58] Field of Search ........................ 260/75 UA, 75 H

[56] References Cited
U.S. PATENT DOCUMENTS

| | | | |
|---|---|---|---|
| 2,370,394 | 2/1945 | Cass ...................... | 260/75 H X |
| 2,621,168 | 12/1952 | Ross et al. ..................... | 260/75 H |
| 2,779,701 | 1/1957 | Robitschek et al. ........... | 260/75 H X |
| 3,227,665 | 1/1966 | Fourcode et al. ............... | 260/861 X |

Primary Examiner—Sandra M. Person
Attorney, Agent, or Firm—Burgess, Dinklage & Sprung

[57] ABSTRACT

An unsaturated polyester having recurring units of the formula

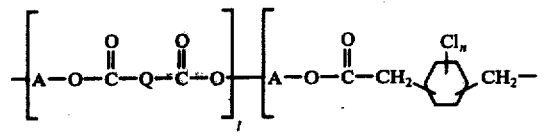

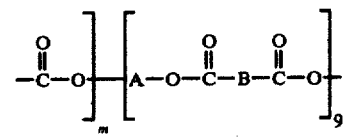

wherein A is an alcoholic moiety, Q is a moiety of other saturated dicarboxylate acids and B is a moiety of an unsaturated dicarboxylic acid, $n$ is 1 to 4, the sum $l + m + g$ is 2 to 20 and $l$ may be 0 or a whole number, said polyester generally having between 1 and 80 mole percent of a chlorinated phenylene acetic acid moiety whose formula is

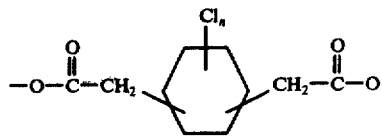

a solution of said such unsaturated polyester, particularly a solution of the same in a copolymerizable monomer, formed objects thereof and a process for the preparation of such unsaturated polyester.

26 Claims, No Drawings

UNSATURATED POLYESTER RESINS

BACKGROUND OF THE INVENTION

1. Fields of the Invention

This invention relates to an unsaturated polyester especially an unsaturated polyester which, when formed into a final object has improved physical properties, especially an improved Martens thermal stability of shape. This invention is also directed to a process for the preparation of such unsaturated polyester, solutions of the unsaturated polyester in copolymerizable monomers and formed objects thereof, especially sheets of improved thermal stability of shape.

DISCUSSION OF THE PRIOR ART

Unsaturated polyesters have long been known. These materials are often referred to as "UP resins" and will be referred herein after simply as "UP resins". They are prepared from unsaturated and saturated dicarboxylic acids, in respect of a carboxylic acid component, and from a polyhydric alcohol, in respect of an alcoholic component. Maleic acid or maleic acid anhydride and fumaric acid, or mixtures thereof, have been principally used for the preparation of these unsaturated dicarboxylic acids. Aliphatic or cycloaliphatic or aromatic dicarboxylic acids are used individually or mixed with the unsaturated dicarboxylic acid to introduce a saturated dicarboxylic acid moiety. Aromatic dicarboxylic acids, such as ortho-, iso- or terephthalic acid or esters thereof have, in the past, been preferably used.

Numerous polyhydric alcohols have been suggested particularly ethylene glycol, propane diol-1,2 and neopentylglycol. Other glycol components which can be employed include materials such as propylene glycol, butylene glycol, diethylene glycol, triethylene glycol, depropylene glycol, 2-mercaptoethanol, di-hydroxyethyl sulfide, glycerol, trimethylolethylmethane, d-sorbitol, d-sorbose, mannitol and hydroxyethyl cellulose, to name a few.

These UP resins are frequently used as dissolved casting resins, i.e., in the form of solutions of a monomer, preferably a monomer which is copolymerizable thereof with, e.g., styrene which is copolymerizable with maleic or fumaric acid structures. After the addition of radical formers, the UP resin solution, containing fillers or reinforcing materials, if desired, is hardened after casting. The fillers which can be employed include quartz, flour, wood flour, heavy spar, chalk and the like. The material can also be reinforced with items such as glass fibers or fabrics which function particularly well as reinforcing materials. The peroxides, which are also used for radical polymerization reactions, can be used as radical formers, either alone (hot setting) or together with accelerators such as tertiary amines or heavy metal compounds (cold setting).

The term "standard UP resins", as used herein, refers to those which are composed of the following components: ethylene glycol and/or propanediol-1,2 as diol components, and maleic acid (for instance, in the form of its anhydride) and phthalic acid (also in the form of its anhydride), as dicarboxylic acid components.

Hardened, non-reinforced castings which are made from such standard UP resins have been found to have bending strengths ranging from 800 to 900 kp/cm² and Martens thermal stability shape ranging from 60° to 70° C. For example, a resin formulation composed of one mole of ethylene glycol, 0.5 mole of maleic acid anhydride and 0.5 mole of phthalic acid anhydride, 60 parts of which are dissolved in 40 parts by weight of styrene and hardened to form a sheet of 4 mm. thick, has a bending strength of 800 kp/cm² and a Martens thermal stability of shape of approximately 60° C or a stability of shape according to ISO/R 75-A of approximately 80° C.

While these thermal stabilities of shape and bending strengths are useful for a number of purposes they are generally considered to be too low. On account of these values it had become desirable to provide a UP resin having a higher thermal stability of shape than the "Standard UP-resins". To this end it was proposed to replace increasing amounts of phthalic acid with isophthalic or terephthalic acid.

It was found that the Martens thermal stability of shape could be increased by 20° to 30° C, raising it from 60° C to 80°–90° C. However, to do this it would require replacement of all of the phthalic acid of the standard UP resin with isophthalic and/or terephthalic acid. For example, with a resin formulation consisting of one mole of ethylene glycol, 0.5 mole of isophthalic acid and 0.5 mole of maleic acid, a Martens thermal stability of shape of 86° C can be achieved in the hardened state. This material would have a thermal stability of shape pursuant to ISO/R 75-A of 104° C and would have a bending strength of 1100kp/cm².

In the case of a partial replacement of the maleic acid with fumaric acid and the partial replacement of the ethylene glycol with neopentyl glycol, the thermal stability of shape is slightly improved. For example, a resin formulation consisting of 0.5 mole of neopentyl glycol, 0.5 mole of ethylene glycol and 0.3 mole of terephthalic acid, 0.15 mole of isophthalic acid, 0.4 mole of fumaric acid and 0.15 mole of maleic acid, there is produced a 4 mm sheet which in a hardened state has a thermal stability of shape of 98° C according to Martens or, according to ISO/R 75-A 119° C. The material has a bending strength of 970 kp/cm².

Unfortunately, neither of the improved results provided by this replacement of all of the phthaic acid with terephthalic and/or isophthalic acid proved to be adequate. It became desirable to provide a still further improved unsatweateel polyester resin which would produce a, for example, a 4 mm. sheet of Martens thermal stability of shape of at least 94° C, preferably at least 115° C. Moreover, it became desirable to provide such a UP resin which, in turn, would provide a sheet having a bending strength of at least 1,000 kp/cm².

Accordingly, it is an object of the present invention to provide an improved UP resin which provides final objects, especially sheets, of improved Martens thermal stability of shape and/or improved ISO/R 75-A thermal stability of shape, preferably also having improved bending characteristics. Moreover, it became desirable to provide such a UP resin which could be readily prepared by the general manipulative techniques employed for the preparation of polyesters from polyhydric alcohols and components supplying a dicarboxylic acid moiety.

SUMMARY OF THE INVENTION

In accordance with this invention there is provided an unsaturated polyester having recurring units of the formula:

-continued

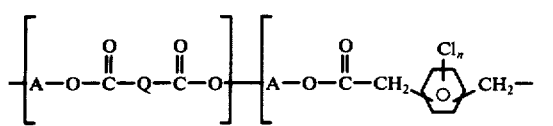

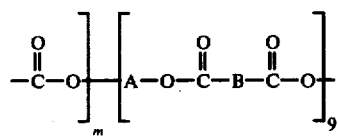

wherein A is an alcoholic moiety Q is a moiety of other saturated dicarboxylic acids and B is a moiety of an unsaturated dicarboxylic acid, n is 1 to 4, the sum l+m+g is 2 to 20 and l may be 0 or a whole number, said polyester having between 1 and 80 mole percent of a chlorinated phenylene acetic acid moiety whose formula is

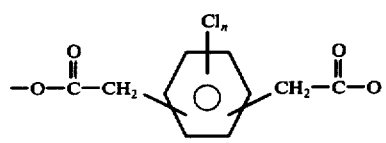

In accordance with this invention there is provided an improved unsaturated polyester comprise moieties of a polyhydric alcohol and moieties of a dicarboxylic acid moiety having the formula

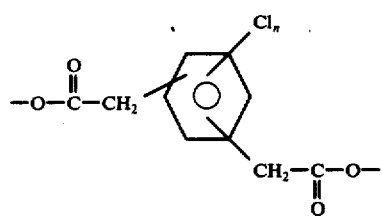

The unsaturated polyesters of the invention are generally prepared by a process which comprises condensing a polyhydric alcohol, such as ethylene glycol, neopentyl glycol and propane diol-1,2 with a dicarboxylic acid supplying moiety which moiety has the formula

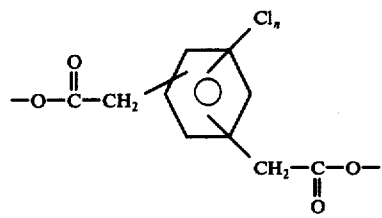

wherein $n$ is 1 to 4.

Thus it has been discovered that if the polyester is one which includes a moiety of a chloro-phenylene diacetic acid the same has improved characteristics such that when formed into a final article especially from a solution containing a copolymerizable comonomer there results an object such as a 4 mm. sheet having improved thermal stability of shape either according to Martens or ISO/R 75-A.

Thus in accordance with the invention there is provided a new UP resin whose molecular weight ranges generally from 1,000 to 6,000 and is preferably between 1,500 and 4,500. The reduced specific viscosity of the UP resin of the invention in between 0.03 and 0.45, determined in a 60:40 mixture of phenol and tetrachloroethane at 25° C in a concentration of 1 gm. per 100 ml. of solvent. Preferably, the resin has a reduced specific viscosity between 0.05 and 0.3. The molecular weight of the resin is determined employing gel chromatography in in tetrahydrofuran.

Generally speaking, unsaturated polyesters are produced, in accordance with this invention, by conducting an esterification or transesterification with a polyhydric alcohol, e.g., propane diol, ethylene glycol and neopentyl glycol with the unsaturated polyester in an inert atmosphere and thereafter polycondensing the same until the desired molecular weight. Condensation can be carried out in the precondensation stage employing, if desired, a transesterification catalyst. Similarly, a catalyst can be employed during the polycondensation reaction which generally takes place at a temperature of between 200° and 240° C. The transesterification was generally carried out until the reaction is nearly complete. Generally, it is conducted at a temperature of between 140° and 200° C for between 0.5 and 3 hours. Thereafter, the precondensate is subjected to a polycondensation at the temperatures indicated above.

It has been found that preferred phenylene diacetic acid components are those wherein the acetic acid moieties are in the meta or iso position. It has also been found that it is desired that, in the formula expressed above, n equals 4. Thus a preferred reactant is a tetrachloro-m-phenylene diacetic acid or alkyl ester thereof having the formula

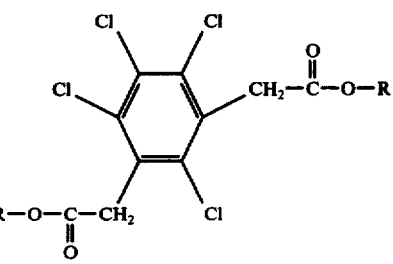

wherein R is a saturated $C_1$–$C_6$ alkyl radical, preferably a a methyl radical.

It has been found that, setting out from the above-described standard resin formulation, as soon as a portion of the orthophthalic acid has been replaced with tetra-chloro-m-phenylenediacetic acid, a substantially greater improvement of the thermal stability of shape is achieved than is achieved by the complete replacement of the orthophthalic acid with isophthalic acid. Thus, a resin formulation consisting of 1mole of ethylene glycol, 0.5 mole of maleic acid anhydride, 0.38 mole of phthalic acid anhydride and 0.12 mole of tetrachloro-m-phenylene diactic acid methyl ester, dissolved 60 weight-parts in 40-weight-parts of styrene and hardened, has a thermal stability of shape of 94° C Martens and 117° C ISO/R 75-A, and a bending strength of 1020 kp/cm². A resin formulation consisting of 1 mole of ethylene glycol, 0.3 mole of phthalic acid anhydride, 0.2 mole of tetrachloro-m-phenylenediacetic acid methyl ester and 0.5 mole of maleic acid anhydride has, in the hardened state, a thermal stability of shape of 105° C Martens and 123° C ISO/R 75-A, and a bending strength of 1180 kp/cm².

By replacing 0.12 and 0.2 mole, respectively, of the orthophthalic acid with tetrachloro-m-phenylene-diacetic acid, the thermal stability of shape is thus increased by 33° and 44° C, respectively, above the standard resin formulation. In contrast, if all of the orthophthalic acid is replaced with 0.5 mole of isophthalic acid, the improvement amounts to only 25° C. By the replacement of the orthophthalic acid with tetrachloro-m-phenylenediacetic acid a considerable improvement of the bending strength is additionally achieved, from 800 kp/cm² to 10/20 and even to 1180 kp/cm².

Thermally shape-stable UP resins containing isophthalic acid and/or terephthalic acid can be improved further in their thermal stability of shape (in the hardened state) by the addition of a phenylene diacetic acid chlorinated in the nucleus or of an alkyl ester thereof. For example, in a resin formulation consisting of 1 mole of neopentylglycol, 0.4 mole of isophthalic acid, 0.1 mole of terephthalic acid and 0.5 mole of maleic acid, if a portion (0.17 mole) of the isophthalic acid is replaced with tetrachloro-m-phenylenediacetic acid, the thermal stability of shape increases from 91° C to 111° C Martens and from 109° to 126° C ISO/R 75-A.

DISCUSSION OF SPECIFIC EMBODIMENTS

The improvement of the thermal stability of shape of UP resins by the use of a phenylenediacetic acid chlorinated in the nucleus as a saturated dicarboxylic acid component was not foreseeable. It is known that polyesters have higher softening ranges when the dicarboxylic acids used are those whose carboxyl groups are bound directly to the aromatic nucleus. If the distance of the carboxyl groups from the aromatic nucleus is increased - as for example when 1,3-phenylenediacetic acid is used instead of isophthalic acid- the softening temperatures decrease (for the same bivalent alcohol components). The improvement observed in the thermal stability of shape of UP resins when some or all of the isophthalic acid is replaced by a phenylenediacetic acid chlorinated in the nucleus is therefore surprising.

The phenylenediacetic acids or the alkyl esters thereof which are chlorinated in the nucleus and used in accordance with the invention can be prepared by the method described in copending application Ser. No. 552,510 filed Feb. 24, 1975 entitled Phenylene Diacetic Acid Dialkyl Esters and Method of Preparing, assigned to the assignee hereof, the disclosure of which is hereby specifically incorporated herein by reference. Particularly easy to prepare are the isomeric tetrachlorophenylenediacetic acid alkyl esters, especially the corresponding methyl esters. In the preparation of, for example, tetrachloro-m-phenylenediacetic acid methyl ester, tetrachloro-m-xylene dichloride is reacted with carbon monoxide and methanol in the presence of cobalt octacarbonyl as catalyst and in the presence of a basic compound, at temperatures around 55° C and at pressures between, say, 5 and 10 atmospheres. In a similar manner, the other phenylenediacetic acid alkyl esters chlorinated in the nucleus can be prepared, or the free acids can be prepared, for example by saponifying the alkyl esters.

The unsaturated polyesters of the invention can contain the following condensed in them as acid components:

A. Moieties of a phenylenediacetic acid chlorinated in the nucleus, in amounts of 1 to 80 mole percent, preferably 9 to 70 mole percent.

B. Moieties of other saturated dicarboxylic acids, if desired, in amounts of 0 to 79 mole percent, and C. Moieties of unsaturated dicarboxylic acids in amounts of 20 to 80 mole percent, preferably 40 to 70 mole percent, components A to C being expressed in molar percentages of the total amount of dicarboxylic acid moieties used, which includes moieties supplied by a corresponding ester or the like. It should be understood that when reference is made to the acid components or acid moieties that the present invention specifically contemplates supplying such a moiety with the corresponding acid chloride, ester or anhydride, where applicable. Thus, if the polyester is to additionally include components of a terephthalic acid, that component can be supplied by the acid chloride, terephthalic acid or terephthalic acid dialkyl ester. All of these components are known to supply the acid moiety in polyester preparations. The same interpretation should be aliphatic saturated and unsaturated compounds which supply the acid component, be they cyclic or alicyclic materials.

The new dicarboxylic acid A can be used in the form of the free acid, and preferentially, in the form of its dialkyl ester, e.g., $C_1$-$C_6$ alkyl ester, especially its dimethyl ester. If the saturated dicarboxylic acid component does not consist exclusively of a phenylenediacetic acid chlorinated in the nucleus, the other saturated dicarboxylic acids used will be those known for the preparation of UP resins, such as orthophthalic acid, isophthalic acid, terephthalic acid, tetrachlorophthalic acid, adipic acid, or mixtures of the individual components, in the anhydride form, or in the form of another polyester-forming derivative. Orthophthalic acid and its anhydride, isophthalic acid, and terephthalic acid and its dimethyl ester, as well as mixtures of these dicarboxylic acid components, are used preferably (Component B). Maleic acid and maleic acid anhydride, and fumaric acid, or mixtures thereof, are preferred as unsaturated dicarboxylic acids (Component C).

Components other than those named above for component B include: succinic acid, sebacic acid, dimethylmalonic acid, acelaic acid, tetrahydrophthalic acid, endomethylenetetrahydrophthalic acid, hexachloroendomethylenetetrahydrophthalic acid or tetrabromophthalic acid.

Other unsaturated dicarboxylic acids which can function as component C include the following unsaturated dicarboxylic acids: itaconic acid, citraconic acid, mecocconic acid or chloromaleic acid.

The polyhydric alcohols which can be employed as diols to prepare the UP resins of the invention include ethylene glycol, diethylene glycol, propane diol-1,2, neopentyl glycol, cyclohexane dimethanol, m- or p-xylylene glycol, tetrachloro-m- or -p-xylylene glycol, propanediol-1,3,butane-diol-1,3,butanediol-1,4,hexanediol-1,6,butene-2-diol-1,4,tricyclodecanedimethanol and tetrabromo-m- or -p-yxlylene glycol, or mixtures thereof with one another. Essentially, subordinate amounts, up to 5 mole percent, for example, of polyhydric alcohols containing at least 3 hydroxyl groups can be used. Examples of such polyhydric alcohols include trimethylol propane and glycerol.

The unsaturated polyesters of the invention preferably contain organically bound chlorine in an amount of 1 to 30 weight percent, preferably 2 to 28 weight percent, based upon the weight of the UP resin. In reporting the amount of chlorine in the UP resin consideration in the statistics herein given is not given to the weight of any cross-linking agent which may additionally be present. Thus, the amount of organically bound chlorine is based upon the weight of uncrosslinked unsaturated polyester.

The preparation of the UP resins of the invention is conducted essentially by the known fusion polycondensation methods although products can also be prepared by polycondensation in solution or by azeotropic polycondensation.

It is desirable to combine the nuclearly chlorinated phenylene diacetic acid supplying agent (ester or acid thereof) with another dicarboxylic acid or ester thereof. A particularly desired nuclearly chlorinated phenylene diacetic acid is a tetrachlorophenylene diacetic acid and a particularly desirable saturated dicarboxylic acid component to be used therewith is dimethylterephthalate or dimethylisophthalate. The materials are transesterified with the desired diol or mixture thereof. Upon completion of the transesterification the reaction mixture is subjected to polycondensation with the balance of the acid components which can be supplied in the free acid, anhydride form, as desired.

Generally, the transesterification can be performed in known manner at a temperature of 140°–200° C employing known transesterification catalysts such as lead dioxide, zinc acetate or manganese acetate. After the addition of the balance of the dicarboxylic acid components, especially maleic acid an/or fumaric acid, the polycondensation can be completed by heating the reaction mixture up to a maximum temperature of 240° C, preferably 200°–230° C, up to the desired molecular weight of the UP resin.

Due to the sensitivity of the reactants, especially the alcoholic components, to oxidation at the reaction temperatures, both the transesterification and the polycondensation are performed under an inert gas atmosphere. The addition of catalysts, such as organic zirconium or organic tin compounds, particularly the zirconates of stereo-impeded 1,3-diols or dialkyl tin salts of organic acids, has proven desirable for the acceleration of the polycondensation of the first group, the zirconate of 2-ethylhexanediol-1,3 can be used, and, of the second group, dibutyl tin stearate or dibutyl tin oleate can be used as catalyst.

If the saturated dicarboxylic acids, such as tetrachlorophenylene diacetic acid, isophthalic acid or terephthalic acid are used as reactants in the form of their free acids, it has been found desirable first to add an esterify the saturated dicarboxylic acids and then to add the unsaturated dicarboxylic acids as the final reactants and condense them in.

This order of procedure has advantages especially when fumaric acid is used. UP resins are obtained having smaller styrene-insoluble contents, and the thermally more sensitive unsaturated dicarboxylic acids are not exposed for too long to the high condensation temperature. In addition, the increased content of fumaric ester double bonds at the ends of the polyester chains brings advantages in the sense of a tighter network in the subsequent, cross-linking, radical copolymerization (hardening) with styrene.

The UP resins of the invention are used preferably in the form of solutions as casting resins for the preparation of molded products. The solutions used are those which contain the UP resins of the invention in amounts between 20 and 80 weight percent, preferably between 40 and 70 weight percent, and a monomer, preferably styrene, which can be copolymerized with the maleic ester or fumaric ester structures. Other solvents include: d-methylatyrene, divinylbenzene, acrylonitrile, methylmethacrylate or diallylphthalate.

After the addition of known radical formers, plus accelerators, if desired, and conventional fillers, reinforcing materials, stabilizers or other conventional additives, if such are to be used, the material is set after casting.

In order to more fully illustrate the invention and the manner of practicing the same the following examples are presented. In the examples below various measurements are given. These measurements have been determined in accordance with standard measuring techniques according to various Deutsche Industrie Norms (DIN) as follows:

| | |
|---|---|
| Vicat Temperature | DIN 53,460, Method B |
| Bending Strength | DIN 53,452 |
| Impact Toughness* | DIN 53,453 |
| Notch Impact Toughness | DIN 53,453 |
| Ball Impression Hardness | DIN 53,456 |
| Martens Temperature* | DIN 53,458 |
| ISO/R 75-A | DIN 53,461 |

*Measurements performed on the small standard specimen.

EXAMPLES

EXAMPLE 1

62 grams (1 mole) of ethylene glycol and 43.2 grams (0.12 mole) of tetrachloro-m-phenylenediacetic acid methyl ester plus 0.05 gram of lead dioxide were placed in a reaction vessel equipped with a stirrer, and transesterified in a temperature range rising from 150° C to 180° C while nitrogen gas was passed through the reactor at a slow rate. When the yielding of methanol ceased, 56.2 g (0.38 mole) of phthalic acid anhydride and 49 g (0.5 mole) of maleic acid anhydride together with 0.03 g of hydroquinone were added and esterified for 1 hour at 180° C. Then 0.1 g of the zirconate of 2-ethylhexanediol-1,3 was added as a polycondensation catalyst, the temperature was raised to 210° C over a period of 1 hour, and polycondensation was performed for 3 hours at this temperature. A UP resin was obtained having a molecular weight as determined by gel chromatography in tetrahydrofuran ($M_{GPC}$) of 2900 and having an organically bound chlorine content of 9% by weight.

The UP resin is dissolved in styrene in proportions of 60 weight-parts resin in 40 weight-parts styrene, and the colorless, transparent UP resin solution is hardened in a mold with 2 weight percent dibenzoyl peroxide paste (50% dibenzoyl peroxide) and 0.25% by volume of a 10% solution of dimethylaniline in styrene at 40° C for 3 hours and cured for 6 hours at 135° C.

A colorless, transparent plate 4 mm. thick is obtained having the following characteristics:

| | |
|---|---|
| Vicat temperature | 176° C |
| Thermal stability of shape: | |
| Martens* | 94° C |
| ISO/R 75-A | 117° C |
| Impact toughness* | 9.4 cmkp/cm2 |

| | |
|---|---|
| Ball impression hardness | 1520 kp/cm² 10 sec. |
| Bending strength | 1020 kp/cm² |

*Tests performed on the small standard specimen.

EXAMPLE 2

In a manner similar to Example 1, a UP resin was prepared from 62 g (1 mole) to ethylene glycol, 72 g (0.2 mole) of tetrachloro-m-phenylenediacetic acid methyl ester 44.4 g (0.3 mole) of phthalic acid anhydride and 49 g (0.5 mole) of maleic acid anhydride, and had a molecular weight $M_{GPC}$ of 3100 and an organically bound chlorine content of 14% by weight.

When 60 weight parts of this resin was dissolved in 40 weight parts of styrene and hardened and cured as in Example 1, a transparent, colorless plate 4 mm. thick was obtained having the following characteristics:

| Thermal stability of shape | |
|---|---|
| Martens* | 105° C |
| ISO/R 75-A | 123° C |
| Impact toughness* | 8.7 cmkp/cm2 |
| Bending strength | 1180 kp/cm² |

*Tests performed on the small standard specimen.

EXAMPLE 3

(Given for purpose of comparison; tetrachloro-m-phenylenediacetic acid methyl ester not used)

A standard UP resin having a molecular weight $M_{GPC}$ of 3000 was prepared form 62 g (1 mole) of ethylene glycol, 74 g (0.5 mole) of phthalic acid anhydride and 49 g (0.5 mole) of maleic acid anhydride, using 0.1 g of the zirconate of 2-ethylhexanediol-1,3 as catalyst, and was dissolved 60 weight parts in 40 weight parts of styrene. The UP resin solution was set in a mold as in Example 1 to produce a colorless, transparent plate 4 mm thick. In the cured state it has the following characteristics:

| | |
|---|---|
| Vicat temperature | 139° C |
| Thermal stability of shape: | |
| Martens* | 61° C |
| ISO/R 75-A | 79° C |
| Impact toughness* | 8.2 cmkp/cm2 |
| Ball impression hardness, 10 sec. | 1440 kp/cm² |
| Bending strength | 820 kp/cm² |

*On the small standard specimen.

EXAMPLE 4

(Given for purposes of comparison; 0.5 mole of isophthalic acid used instead of orthophthalic acid)

62 g (1 mole) of ethylene glycol and 83 g (0.5 mole) of isophthalic acid are placed in a reaction vessel equipped with a stirrer and esterified at a temperature rising slowly up to 190° C, under a slow current of nitrogen. After half an hour at 190° C, 49 g (0.5 mole) of maleic acid anhydride is added together with 0.05 g of hydroquinone, condensation is performed for 1 hour at a temperature rising from 180° to 190° C, then 0.1 g of the zirconate of 2-ethylhexane-diol-1,3 is added as catalyst and the mixture is polycondensed for 3 hours after raising the temperature to 210° C. A UP resin is obtained having a molecular weight $M_{GPC}$ of 3300. This is dissolved 60 weight parts in 40 weight parts of styrene, and hardened as in Example 1 to produce a plate 4 mm thick having the following characteristics:

| Thermal stability of shape | |
|---|---|
| Martens* | 86° C |
| ISO/R 75-A | 104° C |
| Impact toughness* | 7.9 cmkp/cm2 |
| Bending strength | 1100 kp/cm² |

*Tests performed on the small standard specimen.

EXAMPLE 5

104 g (1 mole) of neopentylglycol and 54 g (0.15 mole) of tetrachloro-m-phenylenediacetic acid methyl ester were transesterified at temperatures rising from 150° to 190° C with the addition of 0.06 g of lead dioxide. When the formation of methanol ended, 44.4 g (0.3 mole) of phthalic acid anhydride and 53.9 g (0.55 mole) of maleic acid anhydride were added together with 0.05 g of hydroquinone and esterified for 1 hour at 180°–190° C. After the addition of 0.1 g of the zirconate of 2-ethylhexanediol-1,3 the temperature is increased over a period of 1 hour to 210° C and polycondensation is performed for 4 hours. A UP resin is obtained having a molecular weight $M_{GPC}$ of 3200 and an organically bound chlorine content of 9.2 weight percent. 60 parts by weight of the UP resin are dissolved in 40 weight parts of styrene and made, as described in Example 1 into a 4 mm. thick plate having the following characteristics:

| Thermal stability of shape | |
|---|---|
| Martens* | 107° C |
| ISO/R 75-A | 122° C |
| Impact toughness* | 8.9 cmkp/cm2 |
| Notch impact toughness* | 1.1 cmkp/cm2 |
| Bending strength | 1025 kp/cm² |

*Tested on the small standard specimen.

EXAMPLE 6

52 g (0.5 mole) of neopentylglycol, 31 g (0.5 mole) of ethylene glycol and 54 g (0.15 mole) of tetrachloro-m-phenylenediacetic acid methyl ester were transesterified in a temperature range increasing from 150° to 190° C, with the addition of 0.05 g of lead dioxide. When the formation of methanol had ended, 44.4 g (0.3 mole) of phthalic acid anhydride and 63.8 g (0.55 mole) of fumaric acid were added together with 0.05 g of hydroquinone, and esterified for 1 hour at 190° C. After the addition of 0.1 g of the zirconate of 2-ethylhexanediol-1,3, the temperature was raised to 220° C and the mixture was polycondensed for 3.5 hours. A UP resin was obtained having a molecular weight $M_{GPC}$ of 2800 and an organically bound chlorine content of 9.7% by weight; the resin was dissolved, 60 weight parts in 40 weight parts of styrene, and hardened as described in Example 1 to form a 4 mm thick plate.

| Thermal stability of shape: | |
|---|---|
| Martens* | 119° C |
| ISO/R 75-A | 133° C |
| Impact toughness* | 7.5 cmkp/cm2 |
| Bending strength | 960 kp/cm² |

On the small standard test specimen.

EXAMPLE 7

104 g (1 mole) of neopentylglycol, 19.4 g (0.1 mole) of terephthalic acid dimethyl ester and 61.2 g (0.17 mole)

of tetrachloro-m-phenylenediacetic acid methyl ester were transesterified, with use of 0.08 g of lead dioxide, in a temperature range rising from 150° to 190° C. 38.2 g (0.23 mole) of isophthalic acid and 49 g (0.5 mole) of maleic acid anhydride together with 0.05 g of hydroquinone were added and the mixture was condensed for 1 hour at 190° C. Then 0.1 g of the zirconate of 2-ethylhexanediol-1,3 was added, the temperature was raised to 220° C, and the mixture was polycondensed for 2.5 hours. A UP resin was obtained having an orginally bound chlorine content of 10% by weight. The UP resin was dissolved 60 weight parts in 40 weight parts of styrene and hardened to form a plate 4 mm thick having the following characteristics:

| Thermal stability of shape: | |
|---|---|
| Martens* | 111° C |
| ISO/R 75-A | 126° C |
| Impact toughness* | 8.9 cmkp/cm2 |
| Bending strength | 1130 kp/cm² |

*On the small standard test specimen.

EXAMPLE 8

(Example for comparison with Example 7, using no tetrachloro-m-phenylenediacetic acid methyl ester)

104 g (1 mole) of neopentylglycol and 19.4 (0.1 mole) of terephthalic acid dimethyl ester were transesterified with the addition of 0.04 g of lead dioxide in a temperature range from 150° C to 190° C. 66.4 g (0.4 mole) of isophthalic acid and 49 g (0.5 mole) of maleic acid anhydride together with 0.05 g of hydroqinone were added and the mixture was esterified for 1 hour at 180°–190° C. After the addition of 0.1 g of the zirconate of 2-ethylhexanediol-1,3, the temperature was increased over a period of half an hour to 220° C and the mixture was polycondensed for 3 hours. The UP resin obtained was dissolved 60 weight parts in 40 weight parts of styrene and made, as described in Example 1, into a 4 mm. thick plate having the following characteristics:

| Thermal stability of shape: | |
|---|---|
| Martens* | 91° C |
| ISO/R 75-A | 109° C |
| Impact toughness* | 1080 kp/cm2 |
| Bending strength | 1080 kp/cm² |

*On the small standard test specimen.

EXAMPLE 9

72.8 g (0.7 mole) of neopentylglycol, 18.6 g (0.3 mole) of ethylene glycol, 67.9 g (0.35 mole) of terephthalic acid dimethyl ester and 36 g (0.1 mole) of tetrachloro-m- phenylenediacetic acid methyl ester were transesterified in the temperature range from 150 to 190° C with the addition of 0.08 g of lead dioxide. As soon as the formation of methanol had ended, 8.3 g (0.05 mole) of isophthalic acid was added and the mixture was esterified for   hour at 190° C. Then 58 g (0.5 mole) of fumaric acid, together with 0.05 g of hydroquinone, was added, and the mixture was esterified for 1 hour at 190° C. After the addition of 0.13 g of the zirconate of 2-ethylhexane diol,-1,3 the temperature was raised to 230° C and the mixture was polycondensed for 3 hours. A UP resin was obtained having an organically bound chlorine content of 7% by weight, of which 60 weight parts were dissolved in 40 weight parts of styrene and made, as in Example 1, into 4 mm thick plates having the following characteristics:

| Thermal stability of shape: | |
|---|---|
| Martens* | 123° C |
| ISO/R 75-A | 139° C |
| Impact toughness* | 9.7 cmkp/cm2 |
| Bending strength | 1220 kp/cm² |

*On the small standard specimen.

EXAMPLE 10

72.8 g (0.7 mole) of neopentyl glycol, 18.6 g (0.3 mole) of ethylene glycol and 180 g (0.5 mole) of tetrachloro-m-phenylenediacetic acid methyl ester were transesterified in the temperature range from 150° to 190° C, with the addition of 0.08 g of lead dioxide. After the formation of methanol had ended, 58 g (0.5 mole) of fumaric acid was added together wih 0.05 g of hydroquinone and the mixture was esterified for 1 hour at 180°-190° C. After the addition of 0.1 g of the zireonate of 2-ethylhexanediol-1,3, the temperature was increased to 220° C and the mixture was polycondensed for 3.5 hours. A UP resin was obtained having a molecular weight $M_{GPC}$ of 3400 and an organically bound chlorine content of 25.4 weight percent. This was dissolved in styrene in a proportion of 60 parts by weight to 40 parts of styrene by weight, and was hardened as in Example 1 to form a plate 4 mm thick. The hardened resin had the following properties:

| Thermal stability of shape: | |
|---|---|
| Martens* | 124° C |
| ISO/R 75-A | 142° C |
| Impact toughness* | 7.4 cmkp/cm2 |
| Bending strength | 1140 kp/cm² |

*Measured on the small standard specimen.

What is claimed is:
1. An unsaturated polyester having recurring units of the formula:

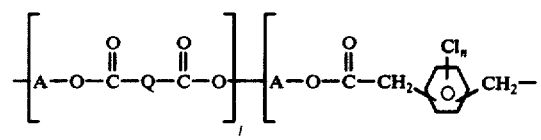

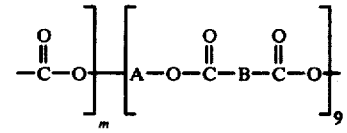

wherein A is an alcoholic moiety, Q is a moiety of other saturated dicarboxylic acids and B is a moiety of an unsaturated dicarboxylic acid, n is 1 to 4, the sum $l + m + q$ is 2 to 20 and $l$ may be 0 or a whole number. said polyester having between 1 and 80 mole percent of a chlorinated phenylene acetic acid moiety whose formula is:

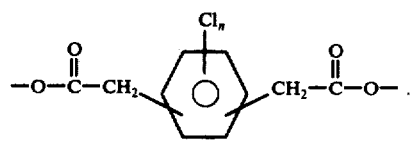

2. In an unsaturated polyester having moieties of a polyhydric alcohol and moieties of a dicarboxylic acid, the improvement wherein said dicarboxylic acid moiety has the formula

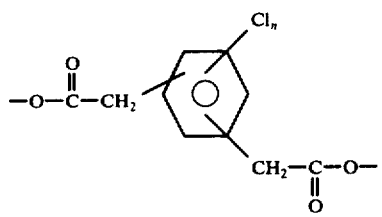

wherein n is 1 to 4.

3. An unsaturated polyester accordiang to claim 2 wherein said polyester contains between 1 and 80 mole percent of said dicarboxylic acid moiety.

4. An unsaturated polyester according to claim 2 having a molecular weight of between 1,000 6,000, determined by gel chromatography in tetrahydrofuran.

5. An unsaturated polyester according to claim 4 having a molecular weight of between 1,500 and 4,500, determined by gel chromatography in tetrahydrofuran.

6. An unsaturated polyester according to claim 4 having a reduced specific viscosity between 0.03 and 0.45 determined in a 60:40 mixture of phenol and tetrachloroethane at 25° C in a concentration of 1 gram per 100ml. solvent.

7. An unsaturated polyester according to claim 6 having a reduced specific viscosity between 0.05 and 0.3.

8. An unsaturated polyester according to claim 4 containing organically bound chlorine in an amount of 1 to 30 weight percent, based upon the weight of said unsaturated polyester.

9. An unsaturated polyester according to claim 8 containing organically bound chlorine in an amount of 2 to 28 weight percent, based upon the weight of said unsaturated polyester.

10. An unsaturated polyester according to claim 2 wherein the acidic moieties of said polyester consist essentially of:
   A. 1 to 80 mole percent of the residue of nuclearly chlorinated phenylene acetic acid .
   B. A residue of a saturated dicarboxylic acid which is present in an amount up to 79 mole percent.
   C. 20-80 mole percent of the residue of an unsaturated dicarboxylic acid.

11. An unsaturated polyester according to claim 10 wherein said phenylene acetic acid moiety is present in an amount of between 2 and 70 mole percent and said saturated dicarboxylic acid moiety is present in an amount of 0 to Fg mol percent and the moiety of said unsaturated dicarboxylic acid is present in an amount of between 40 and 70 mole percent.

12. An unsaturated polyester according to claim 2 wherein said phenylene acetic acid moiety is supplied by tetrachloro-m-phenylene acetic acid dimethyl ester.

13. An unsaturated polyester according to claim 12 wherein said phenylene acetic moiety is present in said unsaturated polyester together with a moiety of a saturated dicarboxylic acid.

14. An unsaturated polyester according to claim 12 wherein said phenylene acetic acid moiety is present in said unsaturated polyester together with a moiety of an unsaturated dicarboxylic acid.

15. An unsaturated polyester according to claim 2 wherein said phenylene diacetic acid moiety is supplied by tetrachloro-m-phenylene diacetic acid methyl ester and said polyhydric alcohol is selected from the group consisting of neopentyl glycol, ethylene glycol, diethylene glycol, propanediol-1,2, cyclohexane dimethanol, m-xylylene glycol, p-xylylene glycol, tetrachloro-m-xylylene glycol, tetrachloro-p-xylene glycol and mixtures thereof with one another.

16. A polyester according to claim 2 wherein said unsaturated polyester additionally contains a moiety of ortho, iso or terephthalic acid.

17. An unsaturated polyester according to claim 2 wherein said unsaturated polyester additionally contains in its structure a moiety from maleic acid, fumaric acid or a mixture therof.

18. A solution of an unsaturated polyester polymer of claim 1 in a solvent.

19. A solution according to claim 18 wherein said solution includes a comonomer which is copolymerizable therewith.

20. A solution according to claim 19 wherein said solvent is styrene.

21. A formed article of the polymer of claim 1 having a Martens thermal stability of shape of at least 94° C.

22. A formed article according to claim 21 having a Martens thermal stability of shape of at least 115° C.

23. A formed article according to claim 21 which is a 4 mm. thick sheet.

24. In a process of preparing an unsaturated polyester by condensation of a polyhydric alcohol with a dicarboxylic acid supplying moiety, the improvement wherein said moiety has the formula:

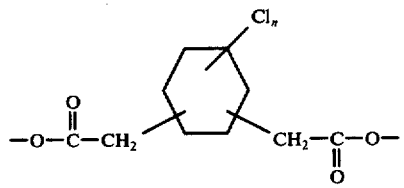

wherein n is 1 to 4.

25. A process according to claim 24 wherein said moiety is supplied by the corresponding dialkyl ester.

26. A process according to claim 24 wherein said moiety is present in a molar amount, based upon the amount of dicarboxylic acid moieties, corresponding to 1 to 80 mole percent.

* * * * *